(12) United States Patent
Allen et al.

(10) Patent No.: US 12,070,639 B2
(45) Date of Patent: Aug. 27, 2024

(54) UTILITY CONNECTION SYSTEMS, SPLINES, AND ASSOCIATED METHODS

(71) Applicant: Overcast Innovations LLC, Seattle, WA (US)

(72) Inventors: Dean C. Allen, Seattle, WA (US); Douglas Moore, Seattle, WA (US); Andie Philip, Seattle, WA (US); Anthony Lee Larson, Seattle, WA (US)

(73) Assignee: Overcast Innovations LLC, Seattle, WA (US)

( * ) Notice: Subject to any disclaimer, the term of this patent is extended or adjusted under 35 U.S.C. 154(b) by 964 days.

(21) Appl. No.: 16/899,350

(22) Filed: Jun. 11, 2020

(65) Prior Publication Data

US 2021/0016119 A1    Jan. 21, 2021

Related U.S. Application Data

(60) Provisional application No. 62/955,935, filed on Dec. 31, 2019, provisional application No. 62/860,320, filed on Jun. 12, 2019.

(51) Int. Cl.
*A62C 35/00* (2006.01)
*A62C 35/58* (2006.01)
(Continued)

(52) U.S. Cl.
CPC ............ *A62C 35/58* (2013.01); *F24F 1/0047* (2019.02); *F24F 7/04* (2013.01); *F24F 11/62* (2018.01);
(Continued)

(58) Field of Classification Search
CPC .......... F24F 11/62; F24F 11/64; F24F 1/0043; F24F 1/0047; F24F 1/005; F24F 1/0057;
(Continued)

(56) References Cited

U.S. PATENT DOCUMENTS 7,455,535 B2 * 11/2008 Insalaco ............... H01R 25/142
439/121
7,470,861 B1 * 12/2008 Ross ..................... H02G 3/128
174/101

(Continued)

FOREIGN PATENT DOCUMENTS

CN        106545117 A    3/2017
EP         2451009 A1    5/2012

OTHER PUBLICATIONS

International Search Report and Written Opinion issued for PCT/US2020/037293 mailed on Sep. 17, 2020.

*Primary Examiner* — Chi Q Nguyen
(74) *Attorney, Agent, or Firm* — Perkins Coie LLP

(57) ABSTRACT

A utility connection system can include a primary utility spline having a length and a support frame. The utility connection system can include one or more utility conduits extending along at least a portion of the length of the primary utility spline and supported by the support frame. The system can include a sensor hub including one or more sensors; and one or more branch access interfaces having one or more ports in communication with the one or more utility conduits. The utility connection system can include a branch utility spline connected to the primary utility spline at the one or more branch access interfaces.

20 Claims, 12 Drawing Sheets

(51) Int. Cl.

| | |
|---|---|
| *F24F 1/0047* | (2019.01) |
| *F24F 7/04* | (2006.01) |
| *F24F 11/62* | (2018.01) |
| F24F 110/10 | (2018.01) |
| F24F 110/20 | (2018.01) |
| F24F 110/64 | (2018.01) |
| F24F 110/66 | (2018.01) |
| F24F 110/70 | (2018.01) |
| F24F 110/72 | (2018.01) |
| F24F 120/10 | (2018.01) |
| F24F 130/40 | (2018.01) |

(52) U.S. Cl.
CPC ....... *F24F 2110/10* (2018.01); *F24F 2110/20* (2018.01); *F24F 2110/64* (2018.01); *F24F 2110/66* (2018.01); *F24F 2110/70* (2018.01); *F24F 2110/72* (2018.01); *F24F 2120/10* (2018.01); *F24F 2130/40* (2018.01); *F24F 2221/36* (2013.01)

(58) Field of Classification Search
CPC ...... F24F 7/04; F24F 2110/20; F24F 2110/64; F24F 2120/10; F24F 2110/70; F24F 2110/72; F24F 2130/40; F24F 2130/00; F24F 2110/66; F24F 2110/00; F24F 210/10; F24F 22/36; A62C 35/58
See application file for complete search history.

(56) References Cited

U.S. PATENT DOCUMENTS

| | | | |
|---|---|---|---|
| 9,190,791 B1* | 11/2015 | Jaena | H01R 25/145 |
| 9,472,912 B2* | 10/2016 | Schirmeier | H01R 25/145 |
| 10,801,761 B2* | 10/2020 | Dobson | F25B 47/02 |
| 11,465,918 B2* | 10/2022 | Bitterly | C02F 1/06 |
| 11,505,141 B2* | 11/2022 | Jones | B60R 16/03 |
| 11,796,190 B2* | 10/2023 | Oh | F24F 13/14 |
| 2005/0141215 A1 | 6/2005 | Fuse et al. | |
| 2007/0077795 A1 | 4/2007 | Insalaco et al. | |
| 2016/0156169 A1* | 6/2016 | Jaena | H02G 5/007 439/213 |
| 2016/0209076 A1 | 7/2016 | Hirsch et al. | |
| 2017/0101618 A1* | 4/2017 | Kamen | C12M 25/14 |
| 2017/0122580 A1 | 5/2017 | Karamanos et al. | |
| 2018/0066838 A1 | 3/2018 | Huang et al. | |
| 2018/0180304 A1 | 6/2018 | Olsen | |
| 2021/0172615 A1* | 6/2021 | Oh | F24F 13/32 |
| 2021/0172648 A1* | 6/2021 | Oh | F24F 13/30 |
| 2021/0265776 A1* | 8/2021 | Moulin | B60N 2/0264 |

* cited by examiner

UTILITY CONNECTION SYSTEMS, SPLINES, AND ASSOCIATED METHODS

CROSS-REFERENCE TO RELATED APPLICATIONS

The present application claims priority to U.S. Provisional App. No. 62/860,320, filed Jun. 12, 2019, entitled UTILITY CONNECTION SYSTEMS, SPLINES, AND ASSOCIATED METHODS and to U.S. Provisional App. No. 62/955,935, filed Dec. 31, 2019, entitled UTILITY CONNECTION SYSTEMS, SPLINES, AND ASSOCIATED METHODS. Both of these provisional applications are hereby incorporated by reference herein in their entirety and made part of the present disclosure.

TECHNICAL FIELD

The present technology generally relates to integrated and centralized communications, monitoring, climate control, and/or mechanical, electrical, plumbing (MEP) systems integrated with mechanical apparatuses.

BACKGROUND

Installing utility infrastructure in an indoor space is an expensive and complicated process. Fluid connections, electrical connection, data connections, and other infrastructure is installed separately, often by separate certified technicians and laborers. Measuring and sizing of various connections often must be done at the job or installation site, requiring inventory and handling of excess materials. Modifying existing utility infrastructure can require breaking down surrounding structures and disassembling previously-installed infrastructure. Adding new infrastructure often requires physical modifications (e.g., cutting, drilling, etc.) to previously installed infrastructure.

BRIEF DESCRIPTION OF THE DRAWINGS

Many aspects of the present technology can be better understood with reference to the following drawings. The components in the drawings are not necessarily to scale. Instead, emphasis is placed on illustrating clearly the principles of the present technology.

DETAILED DESCRIPTION

Figure 1A:
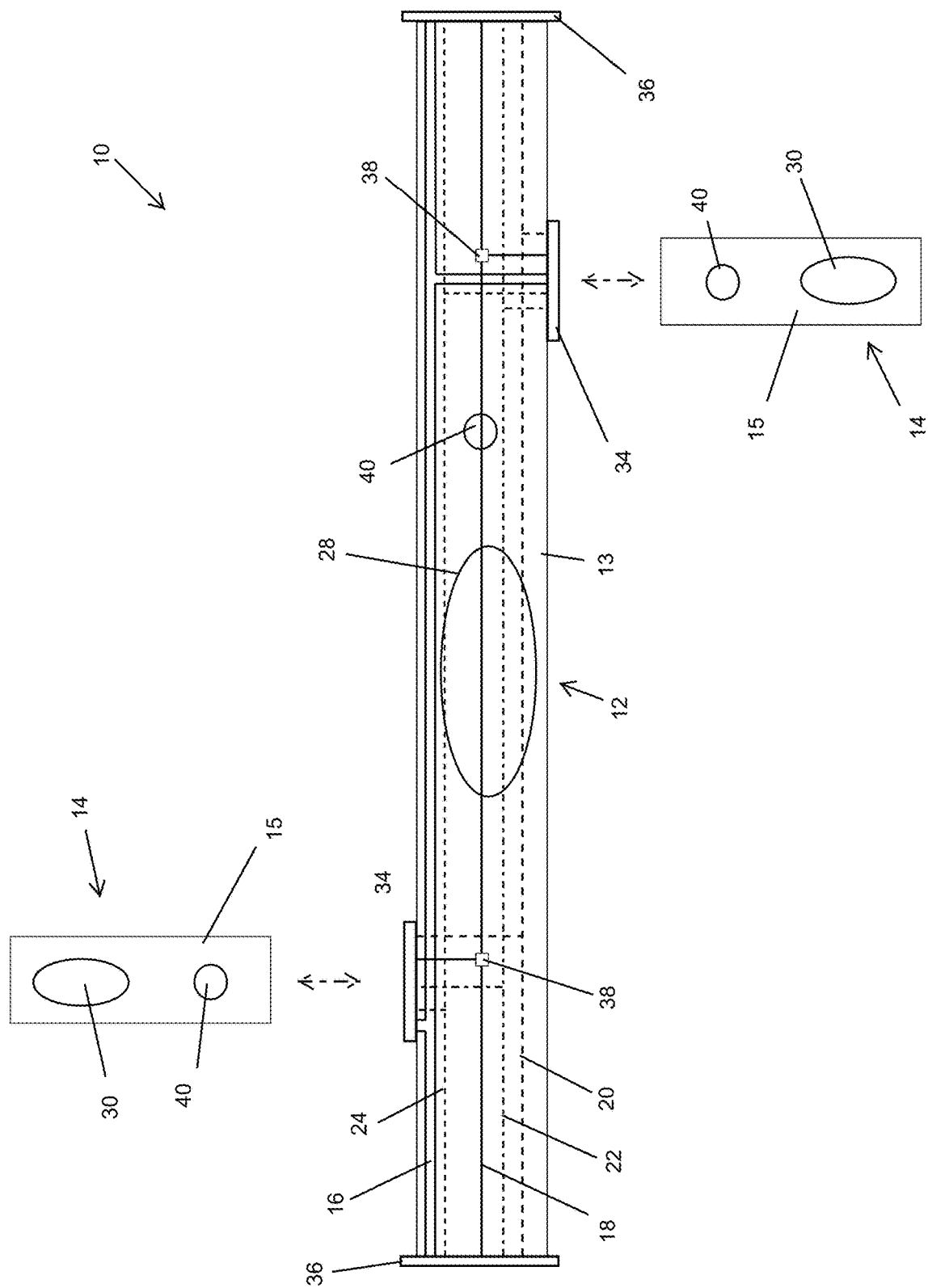
FIG. 1A is a schematic illustration of a utility connection system having one or more utility splines.

In many newly constructed or remodeled structures, designers elect to avoid the use of traditional drop ceilings, often in favor of maintaining visibility of the structural components of the enclosure ceiling. Forgoing use of drop ceilings can lead to several challenges. These challenges include sound propagation and the need to provide sufficient lighting, climate control structure, and supporting hardware while avoiding prominence of unsightly wiring and ducting in the enclosure.

Specific details of several embodiments of utility connection systems for use in enclosures, as well as associated systems and methods, are described below. These utility connection systems, sometimes referred to as splines, hubs, throughways, highways, carriages, or utility modules can be positioned in the upper portions of enclosures. The utility connection systems can be sized and shaped to fit in a plenum space above a drop ceiling. In some applications, the utility connection systems can be mounted along or near a wall of an enclosure. Such wall-installed utility connection systems may be installed inside of a wall, or on an exterior of the wall. The enclosures can include, but are not limited to, offices, concert halls, foyers, cafeterias, restaurants, residential rooms, warehouses, etc. The utility connection systems can include a sound-absorbing panel, covering, or other portion. Various components, sensors, and/or fixtures can be mounted onto or into the utility connection system. For example, the appliances can include one or more of a climate control apparatus configured to regulate a temperature within the enclosure, one or more lighting elements configured to provide light within the enclosure or to provide accent lighting for an aesthetic enhancement, a fire suppression apparatus configured to suppress flames within the enclosure, a fire alarm, a speaker strobe, one or more security cameras, signage (e.g., room identification, egress, and/or emergency signage), occupancy sensors, daylight sensors, pressure transducers, sound masking devices, mass notification (e.g., PA) speakers, air quality sensors, Bluetooth® beacons, wireless access points, a sound level sensor (e.g., a sound detection sensor tuned to the sound of firearms), a motion sensor (e.g., an infrared sensor), an air quality monitor, a carbon dioxide sensor, a carbon monoxide sensor, a smoke detector, a light level sensor, a heat sensor, a room temperature sensor, and a humidity sensor. One or more of the above-listed devices can be releasably connectable to a chassis or other portion of the utility connection system. For example, clips, detents, and/or other quick-release connections can be used to connect the devices to the utility connection system. In some embodiments, the utility connection system includes preconfigured locations for installation (e.g., plug and play installation) of one or more types of devices.

Generally, the utility connection systems (e.g., spline systems) can be used to provide for plug-and-play functionality for mechanical, electrical, plumbing, fire, and/or data (MEPFD) connection. In some embodiments, the utility connection system includes a plurality of fluid lines configured to provide fluid service and return to one or both of the fire suppression apparatus and the climate control apparatus, and/or a plurality of electrical connections connected to the sound-absorbing substrate and configured to provide electrical power and/or data to at least one of the climate control apparatus, the fire suppression apparatus, and the one or more lighting elements.

The utility splines described herein can provide a "plug and play" building standard infrastructure encompassing luminaire fixtures, sensors and devices, data highways, line voltage distribution, HVAC distribution, with numerous finishes for noise absorption and aesthetics. The modular, interconnecting splines are horizontal and vertical utility raceways to complete and commission a building system.

The spline chassis can vary in length and/or depth depending on a building's need and are expandable during future tenant improvements (e.g., horizontally and/or vertically). Using expandable spline chassis can realize costs savings during installation of improvements, as such improvements can be run through the spline chassis rather than separately mounted to the building structure. For example, additional electrical and/or data conduits can be run through an expanded chassis without needing to individually and/or separately attach the new conduits to the building structure or otherwise silo the connections/conduits. Further details regarding expandability of the spline chassis are discussed below with respect to FIGS. 1A and 1B. The chassis adheres to the building codes and seismic requirements of the local authority having jurisdiction. The chassis is built using a standardization of materials, such as, for example polymers or metals (e.g., steel, aluminum, etc.). In some configurations, the length and aesthetics are customizable. Customizable aesthetics can include, for example, magnet extruded aluminum finishes, clip on acoustic panels, and/or paint on the chassis. In some embodiments, sensor packs are built into the spline. The sensor pack can be easily installed into the chassis and standardized for every install or customized for various types of installations and client needs. A software platform can accompany the sensor pack(s) and active energy management that connects to electrical, gas, water, and data utilities for predictive smart building control and utility billing. Sensors can integrate with traditional building management systems (lighting, HVAC control, security and more). Luminaire fixtures can be customizable to the tenant or building owners requirement and can come in linear, troffer, pendent, and recessed, accent or standard-low voltage, line voltage and with/without controls built in. Standardization of the MEPFD connections of the splines/chassis can allow for stacking and/or daisy-chaining of two or more splines in a given installation.

Preferably, the splines described herein can be used in combination with controllers and other structures described in U.S. Provisional App. No. 62/955,848, filed Dec. 31, 2019 and entitled METHODS AND SYSTEMS FOR MANAGING OPERATIONAL PARAMETERS IN A TARGET ENVIRONMENT, the entire disclosure of which is hereby incorporated by reference herein and made part of the present disclosure. The splines can include smart sensors or sensor packs configured to capture, process, and/or transfer MEPFD data to the controller for various purposes. For example, the data can be used by the controller to monitor and/or manage carbon emissions, energy consumption, or other performance parameter of a given building, campus, or portion of a building or campus. The sensors/sensor packs can be configured to be hardware-agnostic and configured to transmit data in varying formats, as needed. Incorporating sensor into the splines can allow for unsiloed signal generation (e.g., the various types of sensor data may not be transmitted/processed in separate data streams and/or processing paths), reducing barriers for data analysis from varying sensor types.

FIG. 1A provides a schematic illustration of an embodiment of utility connection system 10. The utility connection system 10 can be installed in a new construction project or retrofitted to an existing structure. The utility connection system 10 and/or components thereof can be configured to be demounted, reused, moved, connected to other systems, and/or otherwise reconfigurable to meet tenant and/or structural needs.

As illustrated, the system 10 can include a primary utility spline 12. The spline 12 can include a chassis 13 or other structural support. The chassis 13 can be an elongate structure. Preferably, the chassis 13 is configured to support multiple connections (e.g., water connections, power connections, data connections, etc.) along all or a portion of the length of the chassis 13. The chassis 13 can be configured to facilitate vertical and/or horizontal expansion of the spline 12. For example, the chassis 13 can include one or more troughs or channels on lower or lateral sides of the chassis 13. These troughs or channels can be configured to facilitate passage of connection (e.g., wires, cables, conduits, etc.) along all or a part of the length of the chassis 13. The troughs/channels can be useful, for example, for adding functional connections to the utility spline 12 after installation. In some embodiments, the chassis 13 or some other portion of the utility spline 12 includes one or more clips, hinges, or other structures configured to facilitate connection of troughs, channels, or other structures to the sides and/or bottom of the chassis 13 before or after installation of the spline 12. Further details regarding expandability and layout of the trough, channels, and other structures of example utility splines are described below with respect to FIG. 1B.

In some embodiments, the system 10 includes one or more branch utility splines 14 configured to connect to the primary utility spline 12. The branch utility splines 14 can include chassis 15 similar to or the same as the chassis 13 of the primary utility spline 12 in function and/or structure. The connection between the branch utility splines 14 and the primary utility spline 12 can be releasable, plug-and-play, and/or otherwise non-permanent. In some embodiments, the primary utility spline 12 and/or branch utility splines 14 include sound-absorbing materials. The sound-absorbing materials can include open cell foams, sponges, porous materials, resonant absorber material, and/or other materials. The sound-absorbing materials can be used to construct structural portions of the splines 12, 14. In some embodiments, the sound-absorbing materials are detachable from the splines 12, 14. In some embodiments, sound-absorbing material can be attached/detached from the splines 12, 14 via hook-and-loop fasteners, magnets, flanges, and/or other attachment mechanisms. Detachability of the sound-absorbing material can allow for reuse of the sound-absorbing material when new and/or replacement splines are installed.

In some embodiments, primary utility spline 12 includes one or more conduits, channels, pathways, and/or other structures configured to pass water, air, and/or wiring therethrough. In the illustrated embodiments, the primary utility spline 12 includes an air conduit/duct 16 (e.g., an HVAC duct), a water pipe 18 (e.g., a cold water pipe configured to carry cold water to a cold chilled beam), electrical wiring 20, data cable(s) 22, and/or gas conduits 24. In some embodiments, the electrical wiring 20 and/or data cables 22 can be directed through an electrical conduit of the spline 12. The splines 12, 14 can include line voltage plug-in points to provide power connections. These plug-ins can be especially helpful in installations where wall outlets are non-existent or out of reach for a particular application.

As illustrated in FIG. 1A, the primary utility spline 12 can include a sensor hub 28. The sensor hub 28 can include one or more of the sensors described above. In some embodiments, the sensor hub 28 is removable and replaceable with other sensor hubs. For example, different sensor combinations can be installed on different primary utility splines 12 depending on the type of structure and/or type of room in which the primary utility spline 12 is installed. In some embodiments, the branch utility splines 14 include sensor hubs 30. In some embodiments, the sensor hubs 30 of the branch utility splines 14 are mechanically and electrically interchangeable with the sensor hub 28 of the primary utility spline 12.

The primary utility spline 12 can include one or more branch access interfaces 34. The branch access interfaces 34 can be configured to connect with the branch utility splines 14. For example, the branch access interfaces 34 can include access ports for the various cables, wires, ducts, and pipes described above. In some embodiments, the branch utility splines 14 includes ports configured to mate with ports on the branch access interfaces 34. The utility splines 14 can include ports to facilitate connection with the all or some of the wires, cables, conduits, and pipes of the primary utility spline 12 via the branch access interfaces 34. In some embodiments, some utility splines 14 include ports that only connect with a subset of the wires, cables, conduits, and pipes of the primary utility spline 12. For example, some branch utility splines 14 can include only wire and cable connections without air and fluid connections. In some embodiments, certain branch utility splines 14 include only wire and fluid connections. Any connection or combination of connections can be employed for a given branch utility spline 14. In some embodiments, one or more branch access interfaces 34 of the primary utility spline 12 include different sets of ports from one or more other branch access interfaces 34.

The primary utility spline 12 can include end access interfaces 36 on one or more both ends of the primary utility spline 12. One or more valves 38 (e.g., 2-way, 3-way, or 6-way valves) can be used to control fluid flow to/from the branch access interfaces 34 and end access interfaces 36. In some embodiments, the end access interfaces 36 are configured to facilitate connection between one primary utility spline 12 and another primary utility spline 12. In some embodiments, the end access interfaces 36 are configured to facilitate longitudinal connection between the primary utility spline 12 and a branch utility spline 14.

In some embodiments, the primary utility spline 12 and/or the branch utility spline(s) 14 include one or more sprinklers 40. The one or more sprinklers 40 can be connected to a main waterline of a structure (e.g., via the water pipe 18 or another pipe or conduit). In some embodiments, the sprinklers 40 are operably connected to one or more sensors on the spline 12, 14 (e.g., in the sensor hubs 28, 30). For example, the sprinklers 40 can be operably connected to one or more of a temperature sensor, smoke detector, and/or other sensors (one or more of which may be installed on the spline 12, 14).

The primary utility splines 12 can have varying lengths. For example, the length of a given primary utility spline 12 can be selected for a given installation. Generally, the lengths of the primary utility splines 12 can range from three feet to twenty feet, from four feet to thirty feet, from five feet to forty feet, and/or from ten feet to twenty-five feet. Other lengths are also possible. The branch utility splines 14 can have lengths similar to the lengths of the primary utility splines 12. In some embodiments, the lengths of the branch utility splines 14 are between 20-80%, between 30%-120%, between 15%-150%, between 50%-90%, and/or between 75%-100% of the above-disclosed lengths of the primary utility splines 12. In some embodiments, the lengths of the splines 12, 14 increase when sound-absorbing materials or aesthetic materials are applied to the splines 12, 14.

In some embodiments, the length of the respective utility splines 12, 14 can help to guide the preferred installation method and/or timing. For example, longer splines can be easier to install through open wall (e.g., prior to trim installation). Shorter splines may be easily installed in an already trimmed building. The splines 12, 14 can be installed in areas of heavy foot traffic to increase efficient distribution of components of the splines (e.g., Bluetooth® nodes, Wi-Fi nodes, lights, and/or other sensors or components). In some embodiments, the splines 12, 14 include one or more UV up-lights. The UV lights can be inserted into the spline chassis 13 along with small fans or other air-circulation mechanisms that circulate air to the floor and around a space, to sanitize high foot traffic indoor areas. The modularity of the splines 12, 14 can allow for efficient expansion of the splines to build-outs and other remodeling projects. Positioning the various MEPFD connections on/in the splines 12, 14 can provide for a central inspection point and commissioning point for building installations, reducing the need for specialized equipment to find and/or access the inspection/commissioning points in the MEPFD systems.

The splines 12, 14 can be prefabricated assemblies manufactured in a controlled factory environment. In some applications, the splines 12, 14 ship with a smart blue label manufacturing stamp to notify the building owner and the field that the appliance is union-made in a manufactured setting. Manufacturing in a controlled factory environment can allow for inspection and certification of the splines 12, 14 in a single place. Preferably, the splines 12, 14 are manufactured to local and/or national standards and best practices such that the splines can be certified for applications around the country (or around the world). Inspections and certifications can be directed to one or all of the MEPFD structures/functions of the splines. Utilizing centralized inspection and certification and simplify the installation process, as a contractor would no longer need separate inspectors, installers, certifications and/or inspections to be performed at an installation site. Repeatability of the manufacturing process for the splines 12, 14 (as opposed to traditional methods of MEPFD installation that require siloed and separate installation of the various MEPFD connection types) can reduce or eliminate the need for recertification of the splines 12, 14 between projects.

The splines 12, 14 can operate as MEPFD "highways" through an installation site, from which specific connections can be made as needed for a given installation. Running these highways through a structure can reduce the need for specialized connections to be planned or implemented from the core MEPFD structures found in the core of a given installation. Overall installation time of the specific connections at the installation site can be greatly reduced by reducing the number of separate and/or siloed connections that need to be made, by premanufacturing the splines and their built-in connections, and/or by reducing the complexity and requirements for the planning software for the installation site by simplifying the connection infrastructure. The splines 12, 14 can also reduce the amount of cable, piping, wiring, and/or other conduits required to connect specific tenant needs (e.g., plumbing, network connections, power outlets, etc.) in a given installation. The splines 12, 14 can reduce the overall connection clutter within a given structure, as the core connections run through specific pathways in the splines 12, 14 to the various connection points in the building (e.g., as opposed to specialized connections for each of the MEPFD connections). The splines 12, 14 can unlock the ability to add future power outlets to a specific tenant space. For example, a line voltage cable in the spline 12, 14 can jump from the chassis to an adjacent wall, avoiding the need to disrupt occupants in a floor above the retrofit.

Figure 1B:
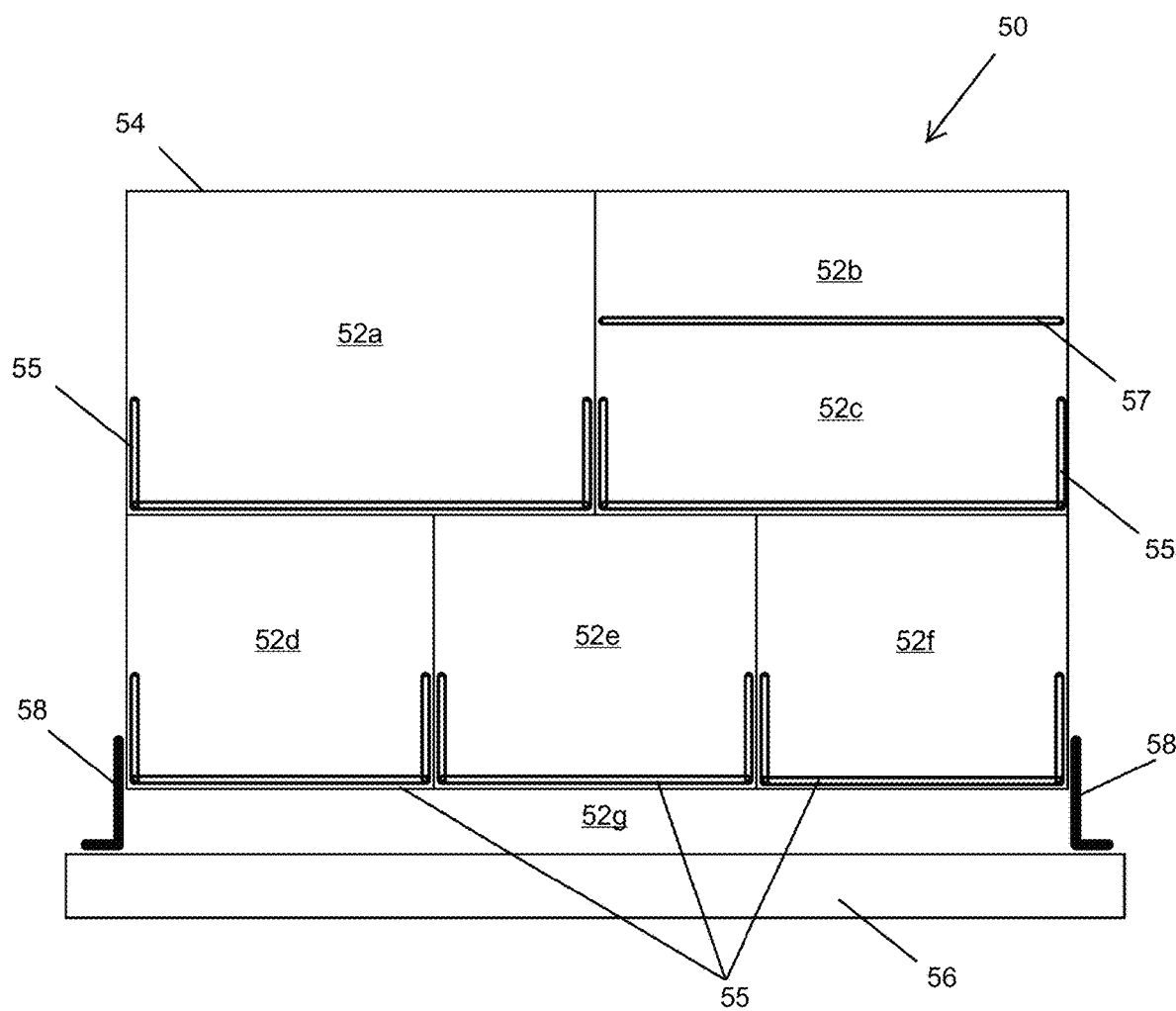
FIG. 1B is a schematic cross-sectional view of a utility spline.

FIG. 1B illustrates a cross-section of an example primary utility spline 50. The spline 50 can include a plurality of channels 52a-g (collectively "52"), raceways, pathways, or other longitudinal sections. The channels 52 can accommodate one or more connection-types (e.g., cables, wires, pipes, etc.) in each channel 52. In some embodiments, each of the individual channels 52 includes a connection-type different from connection-types in other channels 52. For example, the channel 52d could include data connections while the channel 52e includes electrical power connections. Other arrangements are also possible.

The channels 52 can be at least partially defined by a frame 54. The frame 54 may have a fixed outer perimeter. In some embodiments, the frame 54 has an adjustable outer perimeter (e.g., via nested structures, compressed structures, or other structures configured to modify one or more dimensions of the cross-section of the frame 54. The utility spline 50 can include one or more trays 55 or troughs and/or one or more separators 57. The separators 57 can be arranged horizontally, vertically, and/or at an angle oblique to horizontal and vertical. In the illustrated embodiment, the separator 57 has a flat or straight profile. In some embodiments, one or more separators 57 can include stepped and/or curved portions when observed down the length of the separators (e.g., in the frame of reference of FIG. 1B).

The trays 55 and/or separators 57 can be constructed from an insulative material or some other material configured to electrically shield one channel 52 from another channel. In some embodiments, the separators 57 are moveable and connect to the frame 54 or some other portions of the utility spline 50 in more than one position. Moving the separators 57 can adjust the relative sizes of the channels 52 (e.g., to accommodate various sizes of fluid, electrical, and/or data connections).

The utility spline 50 can include a panel 56 connected to one or more sides of the utility spline 50. For example, a panel 56 can be connected to a bottom side of a utility spline 50 positioned at or near a ceiling of a structure. The panel 56 can be connected to the frame 54 directly or via one or more intermediate structures. For example, one or more brackets 58 or other structures can be used to connect the panel 56 to the frame 54. In some embodiments, the panel 56 is connected to the frame 54 via one or more clips or other releasable attachment structures. The panel 56 can have acoustic-dampening properties. In some embodiments, the panel 56 includes one or more patterns or other aesthetic features. A channel 52g can be positioned between the panel 56 and the frame 54 to allow for one or pipes, wires, cables, and/or devices to be positioned between the panel 56 and the frame 54.

Figure 2:
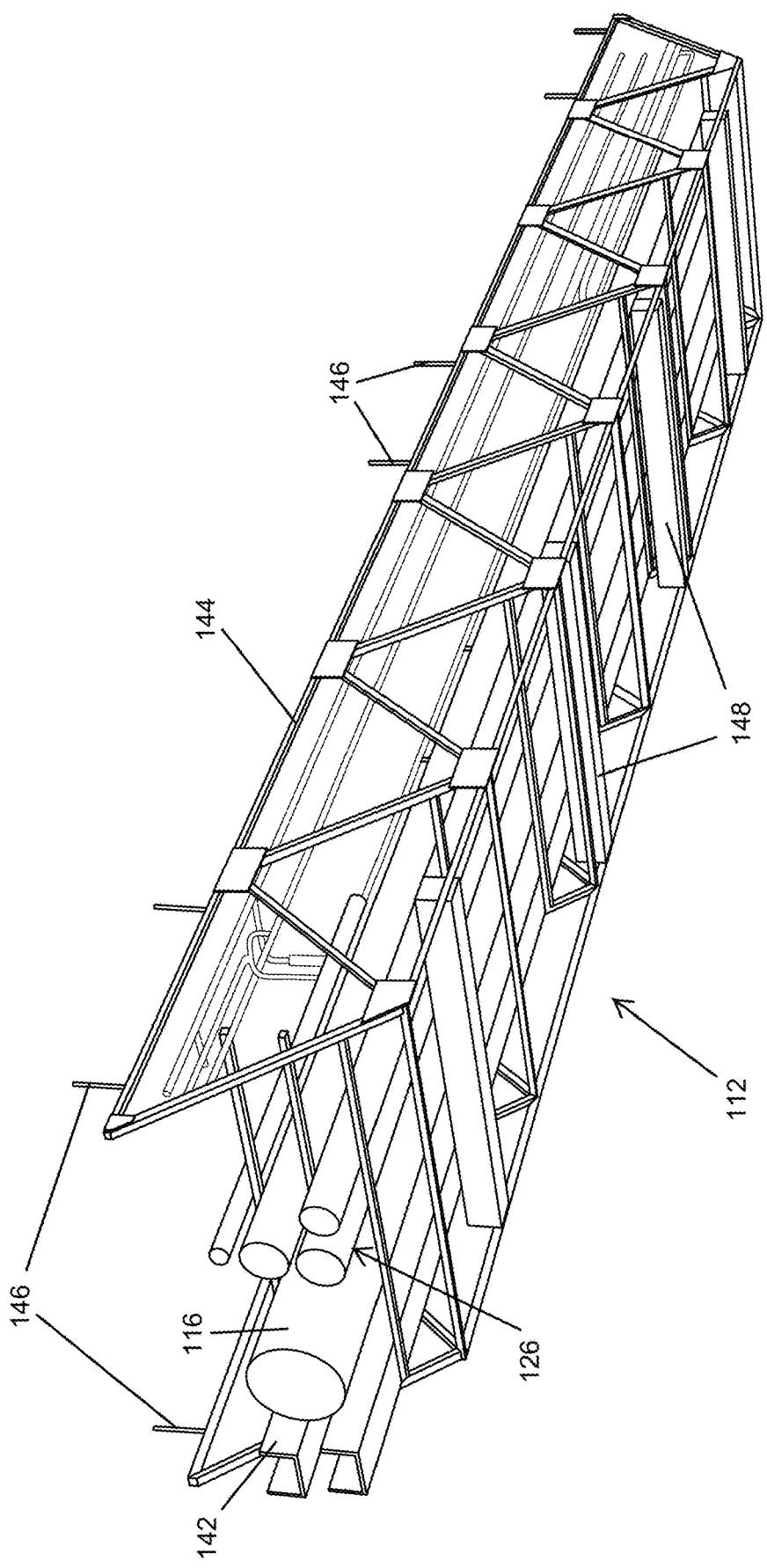
FIG. 2 is a perspective view of an embodiment of a primary utility spline.

FIG. 2 illustrates an embodiment of a primary utility spline 112 have many or all of the features of the primary utility spline 12 described above. As illustrated, the spline 112 can include an air duct 116. The air duct 116 can extend along all or a portion of the length of the utility spline 112. The primary utility spline 112 can include one more conduits 126 (e.g., water conduits, electrical conduits, gas conduits, data cable conduits, etc.). In some embodiments, the primary utility spline 112 includes one or more trays, troughs, or channels 142 configured to housing one or more wires, cables, or other structures. The duct 116 can serve as a divider between various connection types (e.g., separating line voltage from low voltage), thereby reducing or eliminating the need for additional dividers to separate the connection types.

As illustrated, the primary utility spline 112 can include a frame 144, carriage, or other structural support configured to support the various components of the primary utility spline 112. In some embodiments, sound-absorbing materials (e.g., as described above) can be attached or otherwise affixed to the frame 144. In some embodiments, the primary utility spline 112 includes one or more hangers 146 configured to attach to a ceiling or other portion of the structure in which the primary utility spline 112 is installed. The hangers 146 can be adjustable to facilitate levelling of the spline when installed. The number of hangers 146 used in a given installation can be determined based on the overall weight of the primary utility spline 112 and its subcomponents. Using hanger 146 or other structures in the manner illustrated and described herein can reduce or eliminate a need to separately attach the individual conduits/ducts/cables/wires/channels to the ceiling or other portions of the structure in which the utility spline 112 is installed. Further, the use of hangers or other similar structures can allow the splines and other components of the utility connection system to be installed by non-specialized workers (e.g., the workers do not need specialized certifications for installing electrical, HVAC, and/or other utilities) In some embodiments, the primary utility spline 112 includes one or more attachment structures 148 (e.g., blocks, bars, etc.) to which other structures or fixtures (e.g., appliance hubs, described below) can be attached.

The primary utility spline 112 (and any branch utility splines) can allow for use of pre-measured and pre-configured connections (e.g., physical connection), thereby reducing the number of steps needed to set up (e.g., measure, connect, etc.) connections separately at the installation site. For example, wires and cables in/on the utility splines can be sized to fit the needed length for the utility spline at a manufacturing site separate from the installation site. The connections can also be preinstalled on the utility spline before shipping to the installation site, thereby reducing labor required to install the various connections. At the installation site, the utility spline 112 can enable quick installation of the various cables, wires, pipe, and other connections without needing to measure or size the connections at the installation site. This pre-measuring and pre-configuring can reduce wasted materials at the installation site and can reduce the costs of inventorying, shipping, and otherwise handling excess unneeded materials.

Figure 3A:
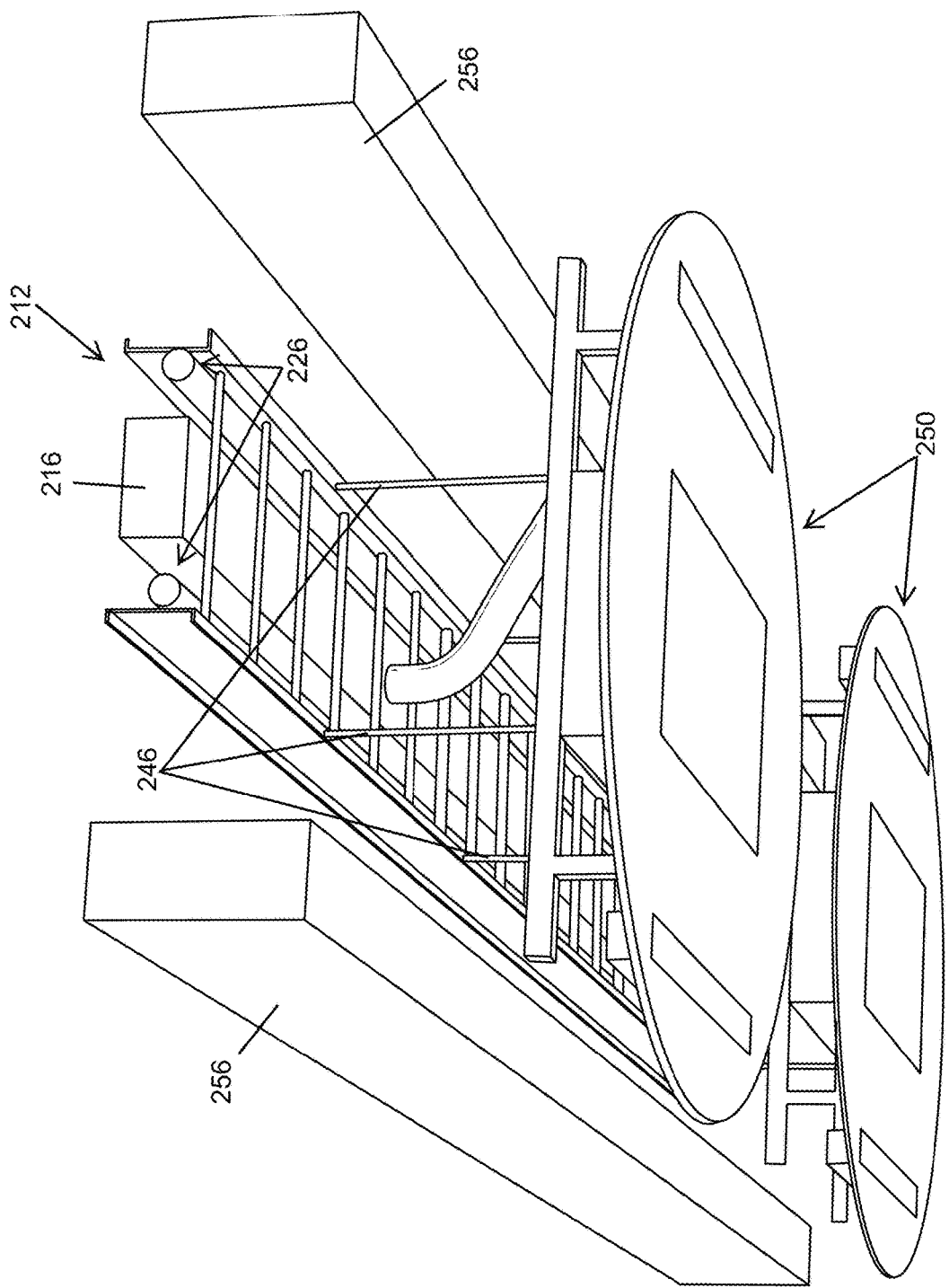
FIG. 3A is a perspective view of another embodiment of primary utility spline to which appliance hubs are mounted.

FIG. 3A illustrates an embodiment of a utility spline 212 that can have many or all of the features described above with respect to the utility splines 12, 14, 112, of FIGS. 1A-2. As illustrated, the utility spline 212 may be installed in a rib bay between ribs 256 of the structure in which the utility spline 212 is installed. One or more appliance hubs 250 may be operably connected to the utility spline 212. For example, the one or more appliance hubs 250 may be connected to the HVAC duct 216 and/or to other wires, cables, or conduits of the utility spline 212. In some embodiments, the applicant hubs 250 are hung from a portion of the utility spline 212 (e.g., from the attachment structures 248) via one or more hangers 258. Further details of the appliance hubs 250 are discussed in U.S. patent application Ser. No. 16/459,509, filed Jul. 1, 2019 and entitled METHOD AND SYSTEM FOR PROVIDING A CENTRALIZED APPLIANCE HUB, the entire disclosure of which is hereby incorporated by reference herein and made part of the present disclosure.

Figure 3B:
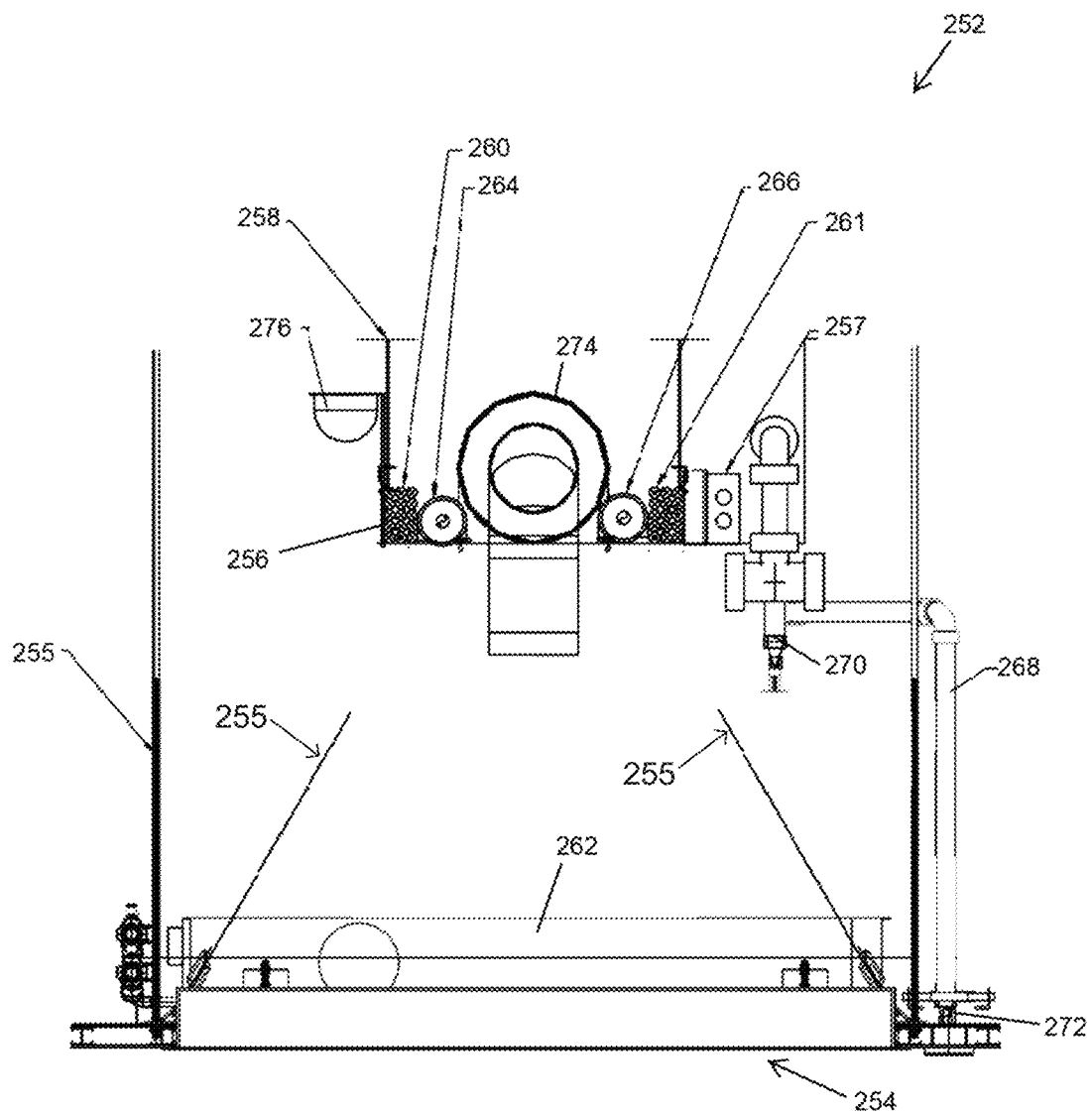
FIG. 3B is a cross-sectional view of a primary utility spline to which an appliance hub is mounted.

FIG. 3B illustrates a cross-sectional view of an embodiment of a utility spline 252 connected to an appliance hub 254. The utility spline 252 can have many or all of the same features described above with respect to the utility splines 12, 14, 112, 212. The spline 252 can include a frame 256. The frame 256 can be connected to a ceiling or other structure via one or more mounting structures 258. The mounting structures 258 can be, for example, screws, hanging cables, and/or other structures configured to connect the frame 256 to a structure. In some embodiments, the appliance hub 254 is separately connected to and supported by the ceiling or other structure. For example, the appliance hub 254 can include one or more appliance mounting structures 255 (e.g., screws, cables, etc.) connected to the appliance hub 254 and to the ceiling.

The utility spline 252 can include one more conduits or connections supported by the frame 256. For example, low voltage cables/wires 260 can be positioned within and/or supported by the frame 256. High/line voltage cables/wires 261 can be positioned within and/or supported by the frame 256. In some configurations, the high voltage cables 261 are positioned on an opposite side of the frame 256 from the low voltage cables 260. The utility spline 252 can include one or more receptacles 257, sockets, or other structures configured to facilitate electrical, data, and/or fluid communication with one or more conduits in the frame 256.

The utility spline 252 can include fluid connections configured to fluidly communicate with a chilled beam 262 on the appliance hub 254. For example, the utility spline 252 can include a dual temperature fluid supply conduit 264 and/or a dual temperature return conduit 266.

The utility spline 252 can be configured to provide water conduits 268 for one or more fire sprinklers. The water conduits can be configured to provide water to fire sprinklers 270 mounted on the utility spline 252 and/or to fire sprinklers 272 mounted onto the appliance hub 254.

In some embodiments, the utility spline 252 includes a smoke detector 276 and/or other sensors. The smoke detector 276/sensors can be mounted to the frame 256. In some embodiments, the utility spline 252 includes an HVAC duct 274 running along all or a portion of the length of the utility spline 252 and supported by the frame 256. The HVAC duct 274, the fluid conduits 264, 266, and/or other components of the utility spline 252 can be secured to the frame 256 via straps, clamps, or other structures.

Figure 4:
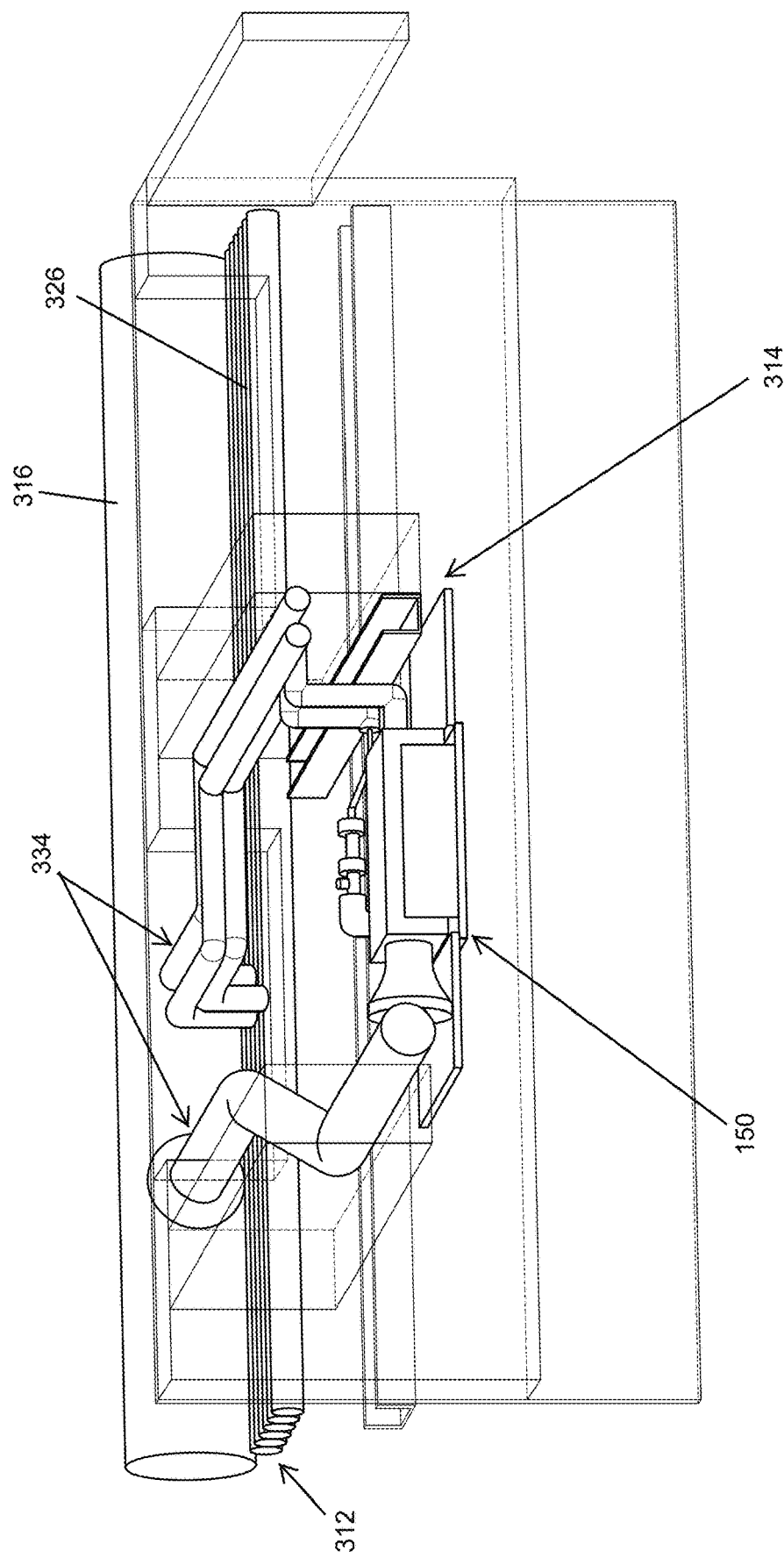
FIG. 4 is a perspective view of another embodiment of a utility connection system having a primary utility spline, a branch utility spline, and appliance hubs.

FIG. 4 illustrates embodiments of utility splines 312, 314 that can have many or all of the same features described above with respect to splines 12, 14, 112, 212 in FIGS. 1A-3. As illustrated, a branch utility spline 314 can be connected to the primary utility spline 312 via a branch access interface 334. The branch access interface 334 can include connection ports for one or more conduits 326 (e.g., water, gas, data, and/or electrical connections) and/or the HVAC duct 316. An appliance hub 350 having some or all of the same features of the appliance hub 250 can be connected to the branch utility spline 314 (e.g., via hangars, fasteners, or other attachment structures). The branch access interface(s) 334 can provide access for repair or modification of components of the utility spline 312 without needing to disassemble and/or without needing extensive disassembly.

Figure 5A:
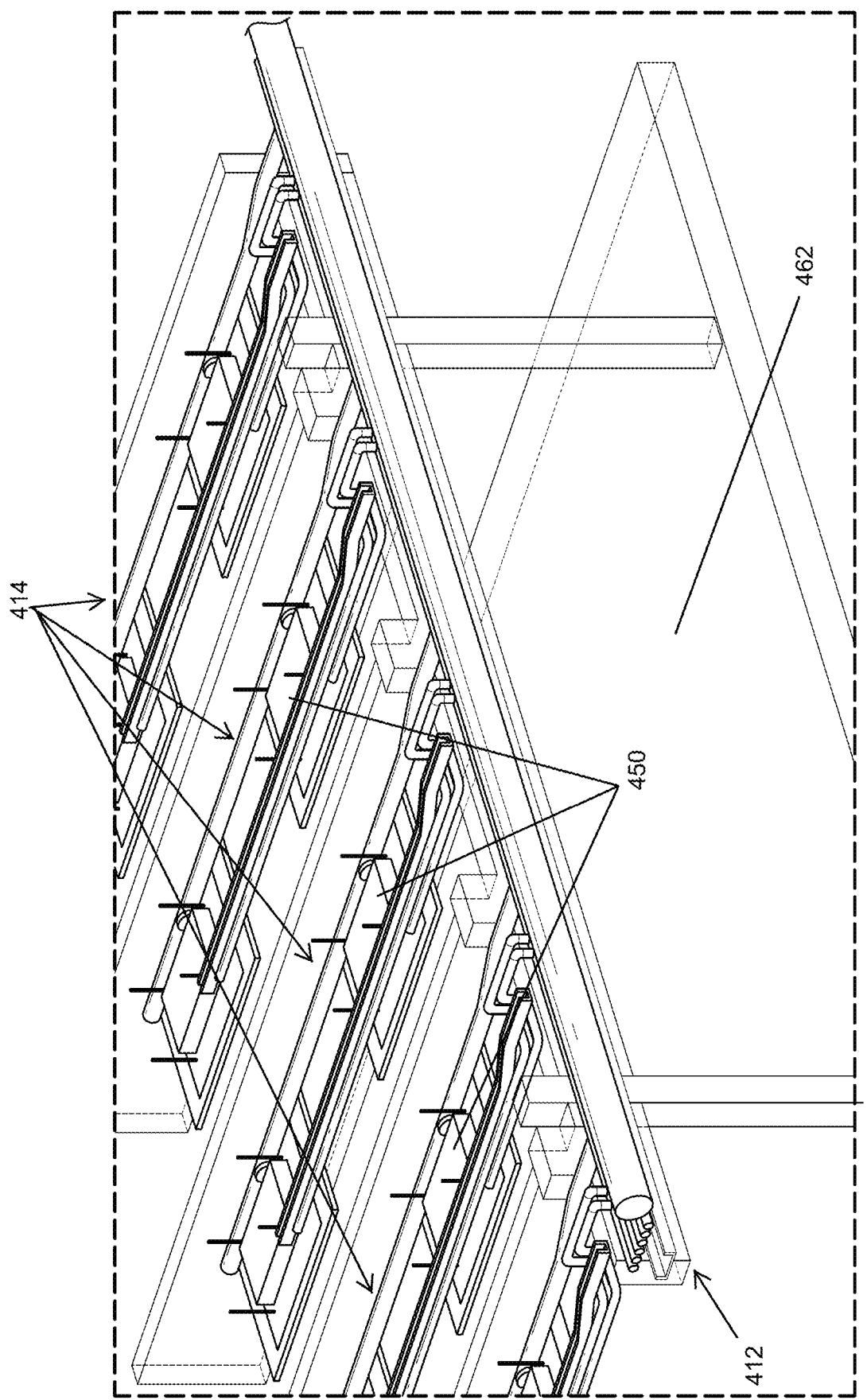
FIG. 5A is a perspective view of another embodiment of a utility connection system having a primary utility spline, branch utility splines, and appliance hubs.
Figure 5B:
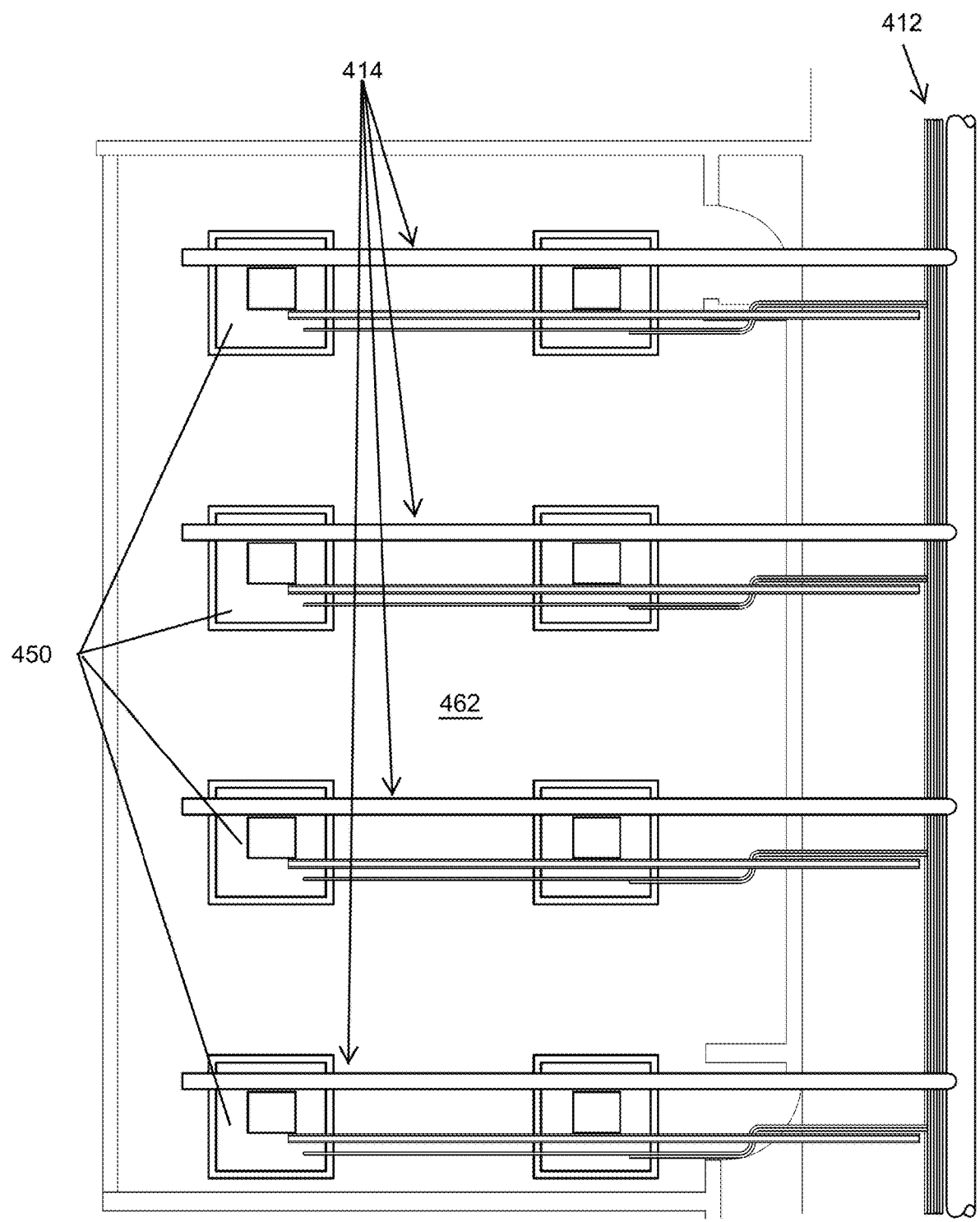
FIG. 5B is a top plan view of the utility connection system of FIG. 5B.

FIGS. 5A-5B illustrate embodiments of utility splines 412, 414 that can have many or all of the same features described above with respect to splines 12, 14, 112, 212, 312, 314 in FIGS. 1A-4. As illustrated, the primary utility spline 412 can extend along an edge of a room 462 or other enclosure. One or more branch utility splines 414 (e.g., tenant splines) can extend into the room 462 to allow for installation of appliance hubs 450 throughout the room 462. In some embodiments, the primary utility spline 412 extends through a center or near a center of the room 462 and branch utility splines 414 are connected to one or both lateral sides of the primary utility spline 412.

The appliance hubs can be configured such that all of the necessary piping, ducting, and/or wiring (collectively "connection structures") for the various components of the appliance hubs are pre-engineered and connected to the various components on the appliance hubs. In some configurations, a single connection interface can provide connection between the various connection structures of the appliance hub with the corresponding utility splines of other utility structures of the building in which the appliance hub is installed. Pre-engineering or pre-assembling the connection structures of the appliance hubs can allow for "plug and play" connection between the appliance hubs and the building, greatly reducing the installation and maintenance costs as compared with a system in which each individual connection structure must be arranged and connected to each subsystem on site. In some applications, the appliance hubs have a second interface configured to facilitate connection between connection structures of one appliance hub with another appliance hub, thereby reducing or eliminating the need to connect each separate appliance hub to the core of the building. In some embodiments, substrate is seismically anchored, thereby eliminating the need to separately anchor each of the components and subsystems installed on the substrate. The appliance hubs described herein can be configured to operate agnostic of preexisting building control systems, allowing easy and fast deployment and integration of the appliance hubs.

Figure 6A:
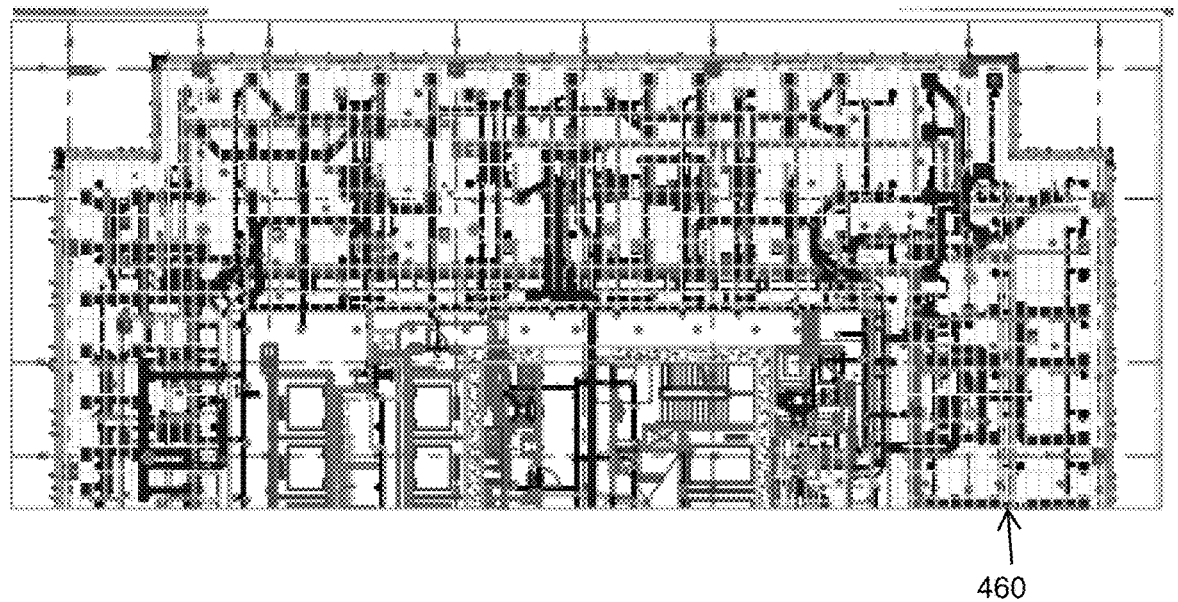
FIG. 6A is a schematic plan view of utility connections in a traditional utility installation.
Figure 6B:
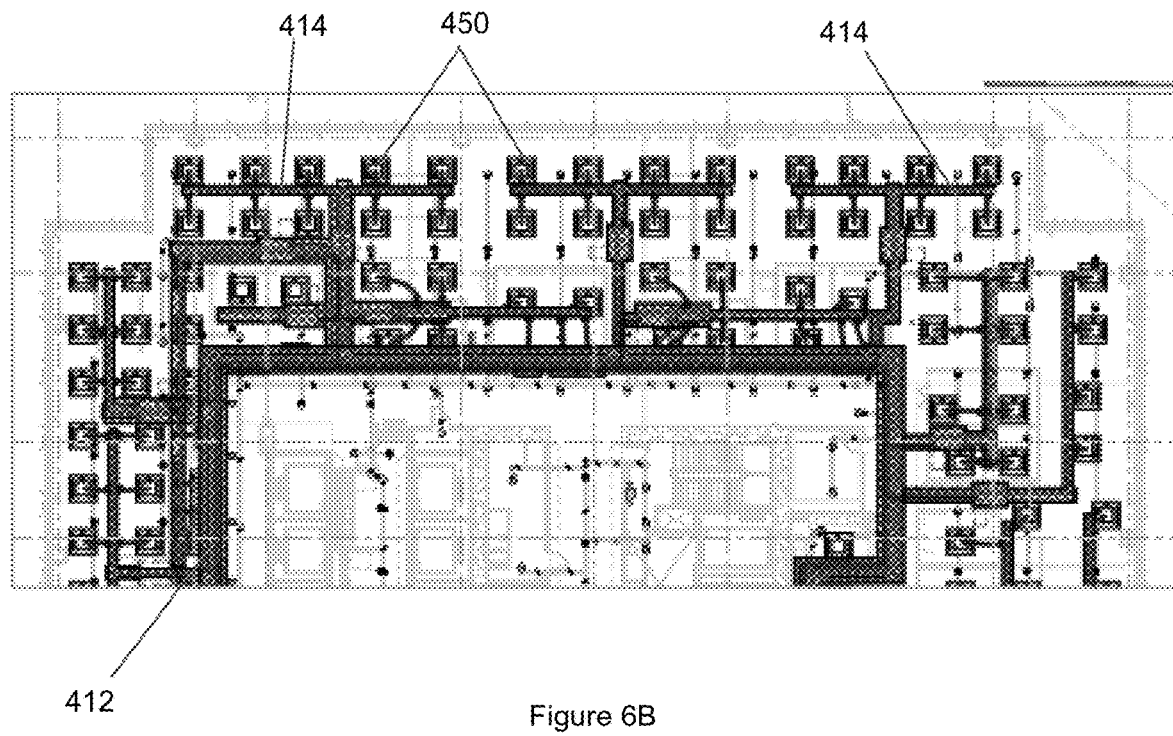
FIG. 6B is a schematic plan view of utility connections in an installation using utility splines and appliance hubs.

FIGS. 6A and 6B schematically illustrate some of the planning advantages provided by use of the splines and appliance hubs described herein. More specifically, FIG. 6A illustrates a typical stick build layout where MEPFD connections 460 are siloed and distributed in a complicated layout that requires separate planning for connection paths for each type of connection. Using the splines 412, 414 (or any of the other splines 12, 14, 312, 314, etc. described herein) and appliance hubs 450 described herein provided a much more organized and less cluttered layout, as illustrated in FIG. 6B. For example, a planner can determine the desired locations of the appliance hubs 450 within a given installation space, then determine the MEPFD connections via primary and branch splines. Using the splines to provided MEPFD connectivity to the appliance hubs allows for unsiloed, consolidated connection pathways to each appliance hub, while using far fewer connection pathways than is the case for traditional MEPFD connection systems.

Figure 7:
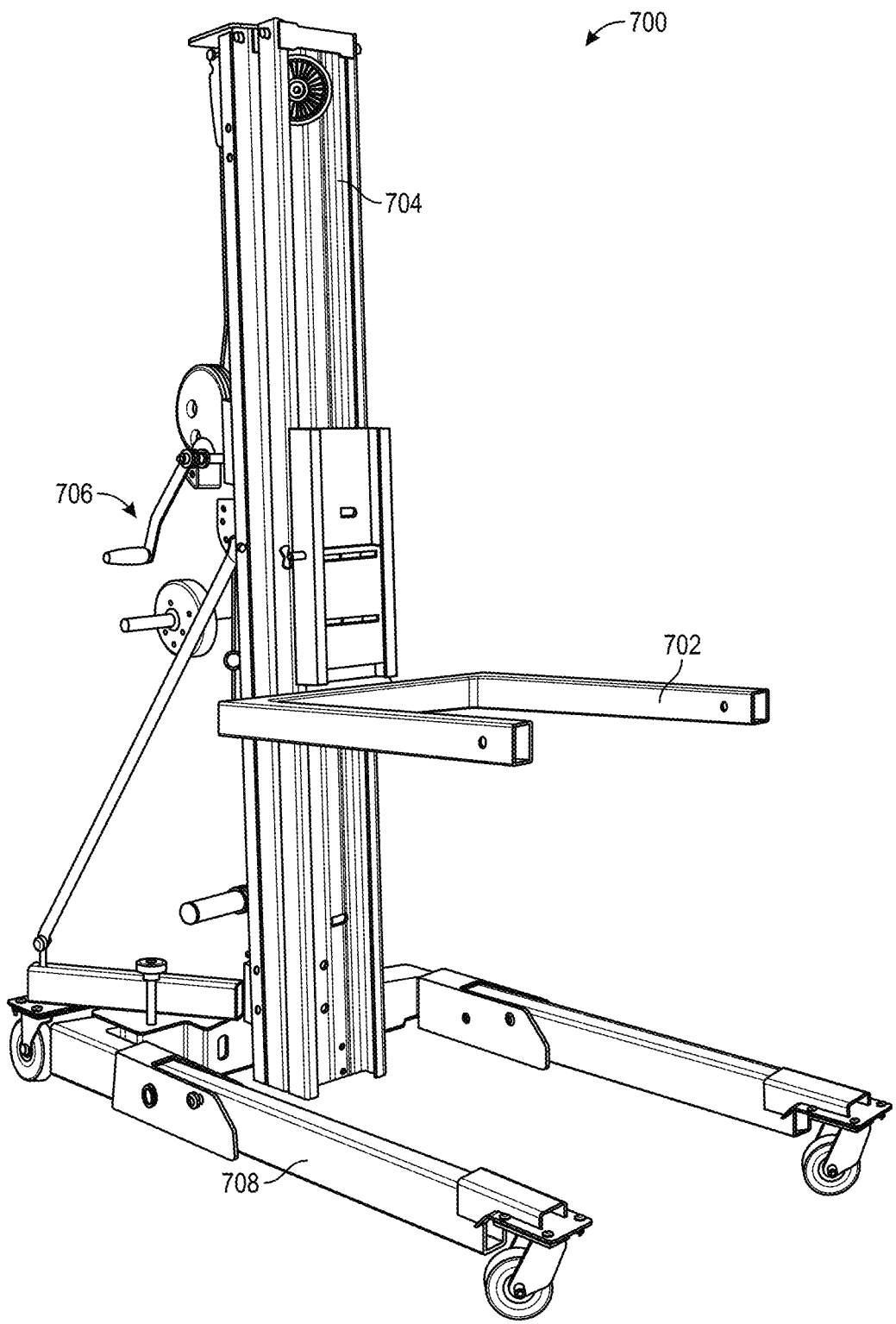
FIG. 7 is a perspective view of an installation mechanism for installing appliance hubs.

FIG. 7 illustrates an installation mechanism 700 (e.g., a lift) configured to enable utility splines to be lifted and installed in enclosures. The installation mechanism 700 can include a utility spline support 702 having one or more arms, frames, or other support structures. The utility spline support 702 can be mounted or otherwise connected to track and pulley system 704 or other system configured to move the utility spline upward and downward. The installation mechanism 700 can include a base 708. The base 708 preferable includes wheels, casters, or other structure configured to allow movement of the installation mechanism 700 with little or no lifting. In some embodiments, the installation mechanism 700 includes a crank 706, wheel, lever, or other mechanism configured to move the utility spline support 702 upward and downward along the track system 704. In some embodiments, movement of the utility spline support 702 along the track system 704 is controlled electronically via a remote or other controller, either wirelessly or via a wired connection. In some embodiments, multiple installation mechanisms 700 are used to lift and install a single utility spline. For example, for long utility splines, installation mechanisms 700 can be positioned at predetermined intervals (e.g., every five feet, every seven feet, every ten feet, or more).

Figure 8:
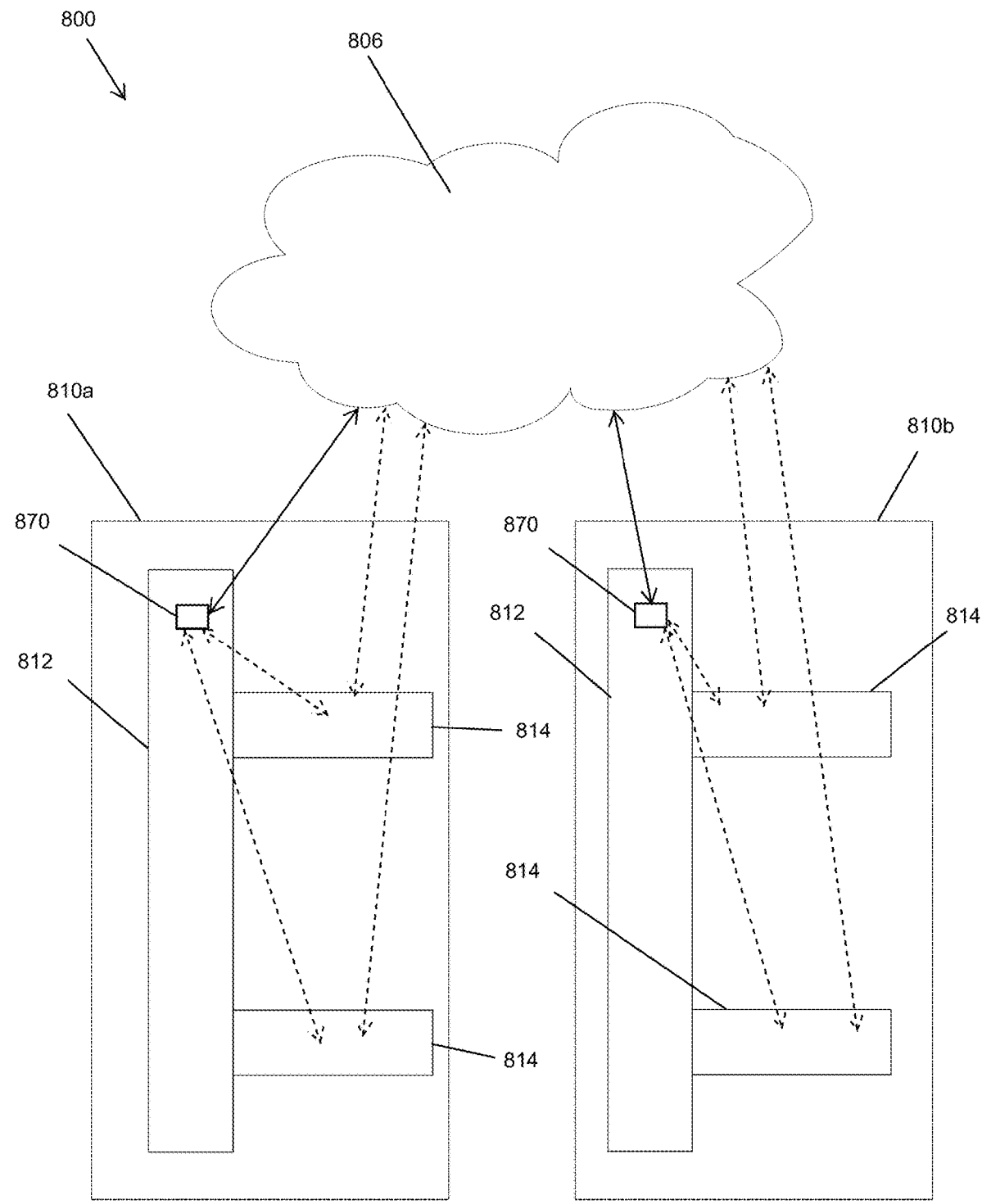
FIG. 8 is a schematic illustration of a utility connection system and a distributed network of servers.

Any or all of the utility splines described herein may include one or more data hubs. For example, as illustrated in FIG. 8, the primary utility splines 812 (which include some or all of the features of the other splines described herein) include data hubs 870. The data hubs 870 can be configured to communicate (e.g., bilaterally) with one or more of the sensors, lighting elements, fire suppression apparatuses, climate control apparatus(es), and/or other components of the utility splines and/or appliance hubs in a given enclosure or portion of enclosure (collectively, "components"). In some embodiments, one or more of the components includes a dedicated wireless data transmitter. In some embodiments, one or more of the components are connected to the data hub(s) 870 via a wired connection. The components and sensors of the utility splines and appliance hubs can be tracked (e.g., physical location, operating status, power status, warranty information, service history, maintenance schedule, etc.) via Bluetooth® connectivity, IP device tracking, RFID and/or other tracking protocols. In some embodiments, this tracking can be facilitated via one or more of the data hubs 870. In some embodiments, the tracking and other associated information is monitorable via a mobile application.

As illustrated in FIG. 8, a plurality of utility splines 812, 814 (or any other utility splines described herein) can be arranged in a network 800. The network 800 can include a network of distributed servers 806 (e.g., a "cloud network"). The cloud network 806 can be connected to one or more utility connection systems 810a, 810b (collectively, 810). Each utility connection system 810 can include one or more primary utility splines 812 and/or branch utility splines 814. In some embodiments, one or more of the utility connection systems 810 includes a data hub 870 configured to relay data and control signals between the utility connection systems 810 and the network of distributed servers 806.

The network of distributed servers 106 can be configured to collect and analyze data gathered from the various utility connection systems 810 (and/or appliance hubs connected thereto). This data can include data from the sensors on the utility splines and/or appliance hubs, utility data (e.g., water and electricity use) from the structure(s) in which the utility connection systems 810 are installed, and/or feedback from users of the utility connection systems 810 and/or appliance hubs. The network of distributed servers 806 can be configured to provide control signals to the utility connection systems to operate one or more of the components included thereon or therewith. In some embodiments, the network of distributed servers 806, or some other component or data hub can be configured to dispatch emergency services, dispatch repair services, or otherwise generate alerts when certain predetermined or learned parameters are detected by the sensors of the utility connection systems 810 or appliance hubs. The network 800 and/or individual utility splines 812, 814 or appliance hubs can be configured to track movement of persons into and out of enclosures. Tracking human movement can allow for adjustments to climate and other energy use parameters (e.g., more people in an enclosure can increase demand for air cooling).

Figure 9:
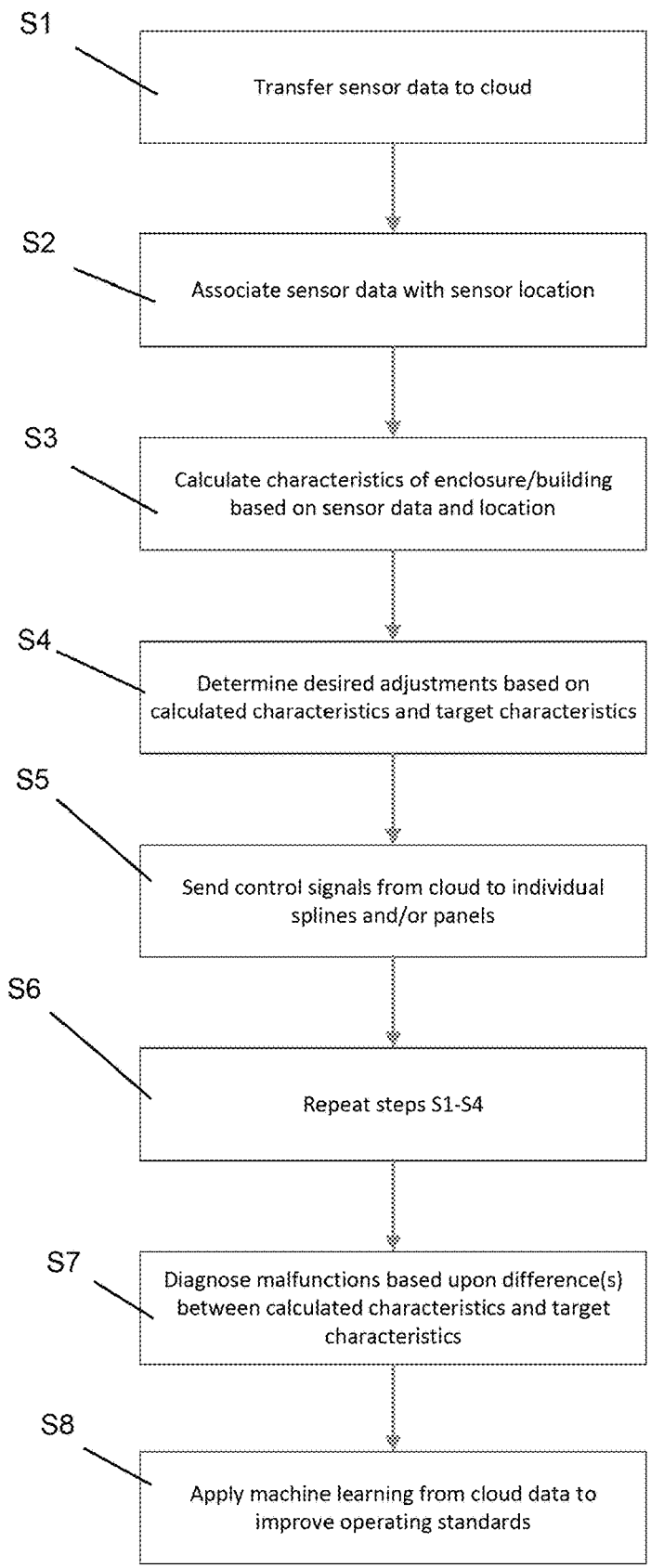
FIG. 9 is a flowchart illustrating a process which may be performed by a utility connection system.

FIG. 9 illustrates a process of controlling the operation of utility splines and their respective components and sensors. The first step S1 of the process may include transferring sensor data from the various utility splines to the network of distributed servers 806. The process can include the step S2 of associating the location data (e.g., address, building, floor, and/or room data) of the sensors with the sensor data provided to the network of distributed servers 806. The network of distributed servers 806 can be configured, as reflected in step S3, to calculate various characteristics of the enclosure and/or building from the sensor data. These calculated characteristics can include occupancy, temperature distribution, air quality, overall comfort, and/or other characteristics. Based on the data from the sensors and/or the calculated characteristics of the enclosures, the network of distributed servers 806 can send control signals (S5) to the various components of the utility splines and/or appliance hubs to adjust the characteristics of the enclosure to desired values. These desired values (e.g., desired temperature, desired air quality, desired humidity, desired lighting levels, etc.) can be pre-established by a user of the system via a user interface (e.g., a mobile application, a voice command interface, PC, or some other user interface).

After the control signals are sent, steps S1-S4 of the process can be repeated (S6). The network of distributed servers 806 can be configured to diagnose malfunctions of one or more components of one or more utility splines and/or appliance hubs based upon discrepancies between the desired values and the measured characteristics determined in the second iteration of step S4 (S7). For example, a higher temperature reading in the second iteration of step S4 may indicate a faulty climate control apparatus. This same discrepancy may, on the other hand, indicate that a door or window is opened. Upon detection of a discrepancy between the desired value and the measured characteristic, an alert may be sent to a designated user to evaluate whether one or more components of the utility splines and/or appliance hubs are faulty. This automated diagnosis regime can help users of the utility splines and/or appliance hubs and related networks 800 save significant maintenance costs. In some embodiments, the utility splines, appliance hubs, networks 800, and/or cloud networks 806 can employ machine learning based on the sensor data, user input, and/or other parameters to improve overall efficiency or other operability parameters of the utility splines and/or appliance hubs. Machine learning can also be used to monitor the habits of the inhabitants of the enclosures in which the utility splines and/or appliance hubs are installed. For example, the utility splines and/or appliance hubs can be configured to monitor energy usage, personnel movement patterns, and other information which can then be conveyed to a user (e.g., a technician or other user) to suggest changes in automatic protocols (e.g., suggestions to shut off lights and/or climate control at earlier times, etc.).

Utilizing a network of utility splines and/or appliance hubs that are uniquely identified by location can allow for overall efficiency gains with respect to energy use, temperature optimization, maintenance management, and/or other parameters. For example, overall carbon production may be tracked using sensors in the various utility splines and/or appliance hubs. Carbon production information can be used to facilitate carbon tax allocation and/or to allow for easier diagnosis of increased carbon emissions. The utility splines and/or appliance hubs, via the network 800 components, can be coordinated together to provide a holistic energy plan for a given building, room, city, or other scale. The networks 800 can also increase the efficiency of monitoring energy use in order to reduce the costs associated with calculating utility bills.

Another method of installing utility conduits at an installation site can include connecting a first utility spline to a structure at the installation site. The first utility spline can be a primary utility spline (e.g., any of the utility splines 12, 112, 212, 252, 312, 412 described herein). The connection to the structure can include hanging from a ceiling of the installation site, installing in a wall of the installation site, or some other connection. The method can include operably connecting a first utility conduit of the utility spline to a first utility source at the installation site. The first utility source can be located, for example, in a core of a building. The first utility source can be a water connection, an electrical connection, a data connection, an HVAC connection, and/or some other connection. The method can include operably connecting a second utility conduit of the utility spline to a second utility source at the installation site. The second utility source can be located, for example, in a core of a building. The second utility source can be a water connection, an electrical connection, a data connection, an HVAC connection, and/or some other connection. In some embodiments, the method includes operably connecting a third utility conduit of the utility spline to a third utility source at the installation site. The third utility source can be located, for example, in a core of a building. The third utility source can be a water connection, an electrical connection, a data connection, an HVAC connection, and/or some other connection.

In some embodiments, the method includes connecting a second utility spline to the first utility spline. The second utility spline can be, for example, a tenant or branch utility spline (e.g., any of the branch/tenant splines 14, 114, 314, 414 described herein). In some embodiments, the second utility spline is a primary utility spline. The method can include connecting the second utility spline to a structure at the installation site. This connection can be made in any of ways described above with respect to the first utility spline. The method includes operably connecting a first utility conduit of the second utility spline to the first utility conduit of the first utility conduit. In some embodiments, the first utility conduit is an HVAC conduit, the second utility conduit is an electrical wire, and the third utility conduit is a data cable. In some embodiments, the first, second, and third utility conduits are supported by the first utility spline and are not connected to the structure at the installation site. For example, the utility conduits can be positioned at least partially within, or otherwise supported by a frame of the first utility spline. In some embodiments, the structure at the installation site is a ceiling.

The method can include installing the first utility conduit in or on the first utility spline at a manufacturing site separate from the installation site. In some embodiments, the method includes sizing the first utility spline and the first utility conduit to at the manufacturing site. Sizing the first utility spline and the first utility conduit can include cutting the first utility conduit to a desired length. In some embodiments, the method includes connecting an appliance hub to the first utility spline. The appliance hub can be similar to or the same as the appliance hubs described above. In some embodiments, connecting the appliance hub to the first utility spline includes connecting the first, second, and/or third utility conduits to the appliance hub. These connections can be made directly or indirectly (e.g., via the utility conduits of the second utility spline).

In some embodiments, the method includes determining a shared route for the first, second, and third utility conduits, wherein connecting the first utility spline to the structure at the installation site comprises positioning the first, second, and third utility conduits along the shared route. Determining a shared route for the first, second, and third utility conduits can include determining a route between the first, second, and third utility sources to an installation location of an appliance hub. The first, second, and third utility sources can be building utility sources in the core of a building. In some embodiments, the first utility spline comprises a frame configured to support the first, second, and third utility conduits.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. Moreover, the various embodiments described herein may also be combined to provide further embodiments. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment.

Certain aspects of the present technology may take the form of computer-executable instructions, including routines executed by a controller or other data processor. In some embodiments, a controller or other data processor is specifically programmed, configured, and/or constructed to perform one or more of these computer-executable instructions. Furthermore, some aspects of the present technology may take the form of data (e.g., non-transitory data) stored or distributed on computer-readable media, including magnetic or optically readable and/or removable computer discs as well as media distributed electronically over networks. Accordingly, data structures and transmissions of data particular to aspects of the present technology are encompassed within the scope of the present technology. The present technology also encompasses methods of both programming computer-readable media to perform particular steps and executing the steps.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms may also include the plural or singular term, respectively. Additionally, the term "comprising" is used throughout to mean including at least the recited feature(s) such that any greater number of the same feature and/or additional types of other features are not precluded. Directional terms, such as "upper," "lower," "front," "back," "vertical," and "horizontal," may be used herein to express and clarify the relationship between various elements. It should be understood that such terms do not denote absolute orientation. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A utility connection system comprising:
 a primary utility spline comprising:
  a length;
  a support frame;
  one or more utility conduits extending along at least a portion of the length of the primary utility spline and supported by the support frame; and
  one or more branch access interfaces having one or more ports in communication with and configured to facilitate connection to the one or more utility conduits; and
 a branch utility spline configured to be connected to the primary utility spline at the one or more branch access interfaces and operably connected to the one or more utility conduits via the one or more ports.

2. The utility connection system of claim 1, wherein the one or more utility conduits include an HVAC duct, a water pipe, electrical wiring, data cable, and/or gas conduits.

3. The utility connection system of claim 1, wherein the primary utility spline further comprises a sensor hub including one or more sensors, wherein the one or more sensors comprise one or more of a sound level sensor, a motion sensor, an air quality monitor, a carbon dioxide sensor, a carbon monoxide sensor, a smoke detector, a light level sensor, a heat sensor, a room temperature sensor, and a humidity sensor.

4. The utility connection system of claim 1, wherein one or both of the primary utility spline and the branch utility spline comprises a sprinkler.

5. The utility connection system of claim 1, wherein the length of the primary utility spline is a first length, and wherein the branch utility spline has a second length extending substantially perpendicular to the first length.

6. The utility connection system of claim 1 wherein the support frame defines one or more channels within the primary utility spline, wherein individual ones of the one or more utility conduits are positioned within a corresponding one of the one or more channels.

7. The utility connection system of claim 6 wherein:
 the one or more utility conduits comprise a first utility conduit and a second utility conduit, and
 the one or more channels comprise a first channel and a second channel, wherein the first utility conduit is positioned within the first channel and the second utility conduit is positioned within the second channel.

8. The utility connection system of claim 7 wherein the first utility conduit comprises one of an HVAC duct, a water pipe, electrical wiring, data cable, or a gas conduit, and wherein the second utility conduit comprises a different one of the HVAC duct, the water pipe, the electrical wiring, the data cable, or the gas conduit.

9. The utility connection system of claim 6 wherein individual ones of the one or more channels comprise a tray positioned around at least a portion of individual ones of the one or more utility conduits to at least partially insulate the individual utility conduits from one or more other utility conduits.

10. The utility connection system of claim 9 wherein the tray comprises an electrically insulative material to electrically shield the individual utility conduits from the other utility conduits.

11. The utility connection system of claim 1 wherein:
 the support frame has an outer perimeter defining a cross-section of the support frame sized to receive a number of utility conduits; and
 the support frame comprises one or more adjustable structures configured to change in size to change the outer perimeter, the cross-section, and the number of utility conduits that can be positioned within the support frame.

12. The utility connection system of claim 1 wherein:
 the support frame further comprises a side and a panel connected to the side; and
 the panel is spaced apart from the support frame to define a channel between the support frame and the panel, the channel being configured to receive individual ones of the one or more utility conduits.

13. The utility connection system of claim 12 wherein the panel comprises an acoustic dampening material.

14. The utility connection system of claim 1 wherein:
 the one or more utility conduits include a first utility conduit, a second utility conduit, and an air duct; and
 the air duct is positioned at least partially between the first utility conduit and the second utility conduit to at least partially insulate the first utility conduit from the second utility conduit.

15. The utility connection system of claim 14 wherein the first utility conduit is a line voltage conduit and the second utility conduit is a low voltage conduit.

16. The utility connection system of claim 1 wherein the primary utility spline has a first lateral side and a second lateral side opposite the first lateral side, wherein the one or more branch access interfaces comprise a first branch access interface on the first lateral side and as second branch access interface on the second lateral side.

17. The utility connection system of claim 16 wherein:
 the branch utility spline is a first branch utility spline connected to the primary utility spline at the first branch access interface; and
 the utility connection system further comprises a second branch utility spline connected to the primary utility spline at the second branch access interface.

18. A climate control system comprising:
 a plurality of utility connection systems, each of the plurality of utility connection systems comprising:
  a primary utility spline comprising:
   a length;
   a support frame:
   one or more utility conduits extending along at least a portion of the length of the primary utility spline and supported by the support frame; and
   one or more branch access interfaces having one or more ports in communication with and configured to facilitate connection to the one or more utility conduits, and
  a branch utility spline configured to be connected to the primary utility spline at the one or more branch access interfaces and operably connected to the one or more utility conduits via the one or more ports; and
 a network of distributed servers configured to bilaterally communicate with the plurality of utility connection systems.

19. The climate control system of claim 18, further comprising at least one network hub configured to bilaterally communicate with the plurality of utility connection systems and/or the network of distributed servers.

20. The climate control system of claim 19, wherein the plurality of utility connection systems are configured to communicate at least one of the following items of information to the at least one network hub and/or the network of distributed servers:
- temperature data;
- air composition data, including one or more of carbon dioxide levels, carbon monoxide levels, oxygen levels, smoke levels, and volatile organic compound levels;
- occupancy levels within one or more specific enclosures;
- humidity data; and
- sound levels.

* * * * *